UNITED STATES PATENT OFFICE.

NATHAN SULZBERGER, OF NEW YORK, N. Y.

OLEIC-ACID DERIVATIVES CONTAINING A PHENYL GROUP.

970,662.

Specification of Letters Patent. Patented Sept. 20, 1910.

No Drawing.

Application filed January 27, 1909. Serial No. 474,635.

*To all whom it may concern:*

Be it known that I, NATHAN SULZBERGER, a citizen of the United States, residing at 34 West Seventy-first street, New York city, in the county of New York and State of New York, have invented new and useful Products—Oleic-Acid Derivatives Containing a Phenyl Group—for Pharmaceutical and Medical Use.

These new bodies are chemical compounds, valuable in medicine, belonging to the class of antiseptics, a number of them also possessing marked action of antifebrile character. They may be used internally as well as externally or locally, in which latter case their property of being readily absorbed by the skin is especially of very great advantage. These new compounds are all derivatives of oleic acid (or of a derivative of such acid) and may be produced from the chemically pure oleic acid as well as from commercial (impurer) products, as such are for instance obtained in saponifying animal or vegetable oils and fats, containing larger or smaller quantities of the other fatty acids. They are produced by chemically combining the radical of oleic acid—or a derivative of such oleic acid radical—with a compound containing a phenyl-group, or a derivative of such aromatic body. These new bodies therefore all represent oleic acid derivatives with an aromatic compound containing a phenyl-group. Such products may be used in their chemically pure form or in the mixtures with oils, waxes, lanolin, paraffin and other bodies. They are all of a fatty nature, due to the oleic acid which they contain and are insoluble in water. A great number of these new products can be distilled under reduced pressure without or with only slight decomposition. Most of them are readily split into their component parts—a phenol and oleic acid—by the action of caustic alkalies. What however characterizes these bodies most markedly and makes them especially valuable in medical and pharmaceutical use is their property of being readily absorbed by the skin, making it possible to obtain a deep and penetrating action of the phenol (cresol, etc.) from which they were produced. The phenols, which I chemically combine with oleic acid, are all monohydric phenols and of such a nature that they will form an ester when combined with stearic acid having a melting point of about 40 degrees C. or more. Such phenols all possess very high antiseptic properties and also their oleic acid derivatives, which latter can be manufactured and prepared cheap enough so that these oleic acid derivatives may be used in many cases, where the free phenols are or can be used, and where the strong and pungent odor of these free phenols is objectionable—these oleic acid derivatives, when properly made, being almost entirely devoid of any odor. Any irritating or caustic action which the parent phenol might possess is also in these new compounds materially reduced if not completely eliminated.

In the following I will describe an example of these new products:

*Phenyl ester of oleic acid.*

60 grams of oleic acid (it is preferable to well dry the acid) are brought into reaction at ordinary temperature with a slight excess over one-third molecular proportions of phosphorous trichlorid, 12 grams being taken. In order to complete the re-action after the phosphorous trichlorid has been added, the mixture is heated to about 80 degrees C. on the water-bath.

The oleic acid chlorid after cooling is poured off the formed phosphorous acid and brought into reaction with 20 grams of phenol. The temperature is gradually raised to about 130 to 140 degrees C. and when the evolution of hydrochloric acid has ceased at this temperature the product is poured into water and washed and freed from all by-products. The phenyl ester forms at ordinary temperature an oily liquid of a more or less yellowish coloration and may be distilled *in vacuo* with very little decomposition. When heated with caustic alkalies it readily decomposes into its constituent parts.

The oleic acid ester of meta-cresol or of a mixture of cresols may be obtained in similar manner. These cresol derivatives represent oily liquids insoluble in water, which can be rectified *in vacuo*. They are all readily absorbed by the skin, permitting a deep penetrating action of the medical quality of cresol and still not possessing the irritating and caustic action of the parent body. These compounds are all very easily made and the yields are practically quantitative in most cases, sometimes the oleic acid will react directly with the phenyl-body. In most cases, however, I prefer to have the oleic acid chlorid first formed and this either in presence of the phenyl-compound (as for instance, when making phenyl stearate by treating the mixture of phenol and stearic acid with phosphorous oxy-chlorid) or in a separate reaction, in which latter case it is best to first free the oleic acid chlorid $$C_{17}H_{33}COCl$$

from the phosphorous compounds before bringing it in chemical reaction with the aromatic compound. The chlorid of oleic acid is obtained easily by treating the oleic acid, preferably after drying it at 120-130 degrees C. with phosphorous-trichlorid (phosphorous pentachlorid or any other chemical reagent, by which the oleic acid can be changed into its chlorid). Not only can these oleic acid compounds be made from the oleic acid itself, but also from derivatives of oleic acid as, for instance, from the dibrom-compound formed by adding 2 atoms of bromin to the oleic acid after the following equation:

$$C_{17}H_{33}COOH + Br_2 = C_{17}H_{33}Br_2COOH.$$

This bromin compound can be changed into its chlorid $$C_{17}H_{33}Br_2COCl$$

and such chlorid will react with phenol in similar manner as the oleic acid chlorid itself, forming thereby:

$$C_{17}H_{33}Br_2CO_2C_6H_5.$$

Also substituted phenols may be employed instead of the phenols themselves, thereby forming products of for instance, the following composition:

$$C_{17}H_{33}CO_2C_6H_4Br.$$

Viewed in the light of current knowledge, the foregoing complete disclosure will suggest further modifications of my invention and discovery especially qualified to meet the various conditions which may from time to time arise. Hence, further elaboration on my part is deemed unnecessary. I desire it to be understood, however, that all such modifications are comprehended within the intended scope of the following claims.

Having thus described my invention what I claim as new and desire to secure by Letters Patent, is:

1. The esters of oleic acid with phenols, being yellowish oily liquids at ordinary temperature insoluble in water, not distillable under ordinary pressure without decomposition, and split by the action of caustic soda into sodium-oleate and the sodium compound of the corresponding phenol, from which they were formed, produced by chemically combining the radical of oleic acid with such a monohydric phenol as will form an ester with stearic acid, having a melting point upward of about 40 degrees C.

2. The oleic acid ester of phenol of the nature described, to be used for medical and pharmaceutical purposes, being a yellow oily liquid at ordinary temperature insoluble in water, not distillable without decomposition under ordinary pressure, split by the action of caustic soda into sodium-oleate and sodium phenolate, produced by chemically combining the radical of oleic acid with phenol and having the following chemical formula—

$$C_6H_5OOC-C_{17}H_{33}.$$

Dated New York, Jan. 26th, 1909.

NATHAN SULZBERGER.

Witnessed by—
 JOHN S. COLWELL,
 BENJAMIN FABER.